United States Patent
Zhang et al.

(10) Patent No.: US 10,171,363 B2
(45) Date of Patent: Jan. 1, 2019

(54) TRAFFIC CONTROL METHOD AND APPARATUS

(71) Applicant: Huawei Technologies Co., Ltd., Shenzhen (CN)

(72) Inventors: Wenge Zhang, Shenzhen (CN); Ridong Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 53 days.

(21) Appl. No.: 15/413,566

(22) Filed: Jan. 24, 2017

(65) Prior Publication Data

US 2017/0134290 A1    May 11, 2017

Related U.S. Application Data

(63) Continuation of application No. PCT/CN2015/083994, filed on Jul. 14, 2015.

(30) Foreign Application Priority Data

Jul. 25, 2014  (CN) .......................... 2014 1 0360788

(51) Int. Cl.
    *H04L 12/851*    (2013.01)
    *H04L 12/825*    (2013.01)
    *H04L 12/803*    (2013.01)

(52) U.S. Cl.
    CPC ........ *H04L 47/2408* (2013.01); *H04L 47/125* (2013.01); *H04L 47/25* (2013.01); *H04L 47/26* (2013.01)

(58) Field of Classification Search
    None
    See application file for complete search history.

(56) References Cited

U.S. PATENT DOCUMENTS 6,822,940 B1 *  11/2004  Zavalkovsky ........ H04L 47/10
                                                     370/235
2002/0087723 A1   7/2002  Williams et al.
                  (Continued)

FOREIGN PATENT DOCUMENTS

CN    101686497 A    3/2010
CN    102143380 A    8/2011
           (Continued)

OTHER PUBLICATIONS

Machine Translation and Abstract of Chinese Publication No. CN104092619, Oct. 8, 2014, 14 pages.

(Continued)

*Primary Examiner* — Eunsook Choi
(74) *Attorney, Agent, or Firm* — Conley Rose, P.C.

(57) ABSTRACT

A traffic control method and apparatus is presented, where the method includes determining, by a back-end network element according to a type of a received service message, a priority of the service message and a resource that needs to be consumed for processing the service message; obtaining, according to the priority of the service message and usage of the resource, a quantity or an adjustment quantity of service messages of a different type to be received in a current period; and sending the quantity or the adjustment quantity of the service messages of the different type to be received in the current period to a front-end network element.

8 Claims, 2 Drawing Sheets

(56) References Cited

U.S. PATENT DOCUMENTS

| | | | |
|---|---|---|---|
| 2003/0095538 A1 | 5/2003 | Kayama et al. | |
| 2004/0165528 A1* | 8/2004 | Li | H04L 12/4641 370/230 |
| 2009/0103434 A1 | 4/2009 | Madsen et al. | |
| 2013/0225181 A1* | 8/2013 | Radulescu | H04W 36/22 455/442 |
| 2014/0192703 A1* | 7/2014 | Chun | H04W 48/20 370/312 |

FOREIGN PATENT DOCUMENTS

| | | |
|---|---|---|
| CN | 102217336 A | 10/2011 |
| CN | 102469548 A | 5/2012 |
| CN | 103746927 A | 4/2014 |
| CN | 103888374 A | 6/2014 |
| CN | 104092619 A | 10/2014 |

OTHER PUBLICATIONS

"3rd Generation Partnership Project; Technical Specification Group Core Network and Terminals; Customised Applications for Mobile network Enhanced Logic (CAMEL) Phase 4; Stage 2 (Release 12)," 3GPP TS 23.078, V12.0.0, Technical Specification, Sep. 2013, 750 pages.

"3rd Generation Partnership Project; Technical Specification Group Radio Access Network; UTRAN Iu interface, Radio Access Network Application Part (RANAP) signalling (Release 12)," 3GPP TS 25.413, V12.2.0, Technical Specification, Jun. 2014, 441 pages.

Hilt, V., Ed., et al., "Design Considerations for Session Initiation Protocol (SIP) Overload Control," draft-hilt-sipping-overload-design-00, Jul. 5, 2008, 17 pages.

Gurbani, V., Ed., et al., "Session Initiation Protocol (SIP) Overload Control," draft-ietf-soc-overload-control-15, Mar. 3, 2014, 37 pages.

Hilt, V., et al., "Design Considerations for Session Initiation Protocol (SIP) Overload Control," RFC 6357, Aug. 2011, 25 pages.

Foreign Communication From a Counterpart Application, Chinese Application No. 201410360788.7, Chinese Notice of Allowance dated Apr. 27, 2017, 2 pages.

Foreign Communication From a Counterpart Application, Chinese Application No. 201410360788.7, Chinese Office Action Sep. 27, 2016, 5 pages.

Foreign Communication Form a Counterpart Application, PCT Application No. PCT/CN2015/083994, English Translation of International Search Report dated Oct. 14, 2015, 3 pages.

Foreign Communication Form a Counterpart Application, PCT Application No. PCT/CN2015/083994, English Translation of Written Opinion dated Oct. 14, 2015, 5 pages.

Foreign Communication From a Counterpart Application, European Application No. 15824686.8, Extended European Search Report dated Aug. 23, 2017, 8 pages.

\* cited by examiner

TRAFFIC CONTROL METHOD AND APPARATUS

CROSS-REFERENCE TO RELATED APPLICATIONS

This application is a continuation of International Application No. PCT/CN2015/083994, filed on Jul. 14, 2015, which claims priority to Chinese Patent Application No. 201410360788.7, filed on Jul. 25, 2014, both of which are hereby incorporated by reference in their entireties.

TECHNICAL FIELD

The present disclosure relates to the field of mobile communications, and in particular, to a traffic control method and apparatus.

BACKGROUND

In a current communications network, as a quantity of users rapidly increases, service models get diverse, and networking becomes complex, a risk of service traffic impacting a communication device increases accordingly. When a volume of the service traffic is beyond a load capability designed for a communication device system, congestion in a large area and a decrease of a call completion rate are usually caused to a communication device, and a communication device fault is even caused. To ensure system stability upon heavy traffic in various service traffic-intensive scenarios, a traffic control technology becomes a research hotspot.

According to a difference of locations of a traffic-control-protected object and a traffic control executor in a network, Internet Engineering Task Force (IETF) Request for Comments (RFC) 6357 classifies traffic control into three types: hop-by-hop, end-to-end, and local overload control. Referring to traffic control models of the three types shown in FIGS. 1A to 1C, FIG. 1A and FIG. 1B belong to network traffic control, in which a front-end network element on a network path controls, according to a load status of a back-end network element, a volume of traffic sent to the back-end network element, for example, in FIG. 1A, the front-end network element A receives a load status of the back-end network element B via a link 101 to process a volume control of traffic sent to the back-end network element B; similarly, the front-end network element B receives a load status of the back-end network element C via a link 102 to perform a volume control of traffic sent to the back-end network element C; in FIG. 1B, the front-end network element A receives a load status of the back-end network element C via a link 201 to perform a volume control of traffic; and FIG. 1C belongs to network element traffic control, in which an overloaded network element controls an actually processed traffic volume according to a resource load status of the overloaded network element, and rejects or discards a service message that is beyond a processing capability of the network element.

In comparison, because traffic control is performed on the front-end network element with respect to the network traffic control, less resources of the back-end network element are consumed, and end-to-end traffic control efficiency is higher. In addition, if the back-end network element has a load-sharing network element, the front-end network element may conveniently distribute a service message that is beyond a processing capability of the back-end network element to the load-sharing network element of the back-end network element, thereby improving network resource utilization and a service success rate. Therefore, a network traffic control model is mainly used in traffic control in the prior art.

In the network traffic control, the back-end network element notifies the front-end network element of an overload message, and the front-end network element determines an overload degree of the back-end network element according to a frequency of sending the overload message by the back-end network element, and finally, determines a volume of traffic that needs to be rejected or discarded; or, the back-end network element calculates a service interval/service speed according to the load status of the back-end network element, and instructs the front-end network element to perform traffic control; or, the back-end network element calculates a traffic control allowed proportion or a traffic control rejection proportion according to the load status of the back-end network element, and instructs the front-end network element to perform traffic control.

It can be learned from the foregoing description that, in the prior art, the front-end network element does not perform overload control according to a load status of a service message of a different type in the back-end network element, causing a problem that traffic control is performed on a non-overloaded service message.

SUMMARY

Embodiments of the present disclosure provide a traffic control method and apparatus, which can resolve a problem in the prior art that traffic control is performed on a non-overloaded service message because a front-end network element does not perform overload control according to a load status of a service message of a different type in a back-end network element.

According to a first aspect, a traffic control method is provided, where the method includes determining, by a back-end network element according to a type of a received service message, a priority of the service message and a resource that needs to be consumed for processing the service message; obtaining, according to the priority of the service message and usage of the resource, a quantity or an adjustment quantity of service messages of a different type to be received in a current period; and sending the quantity or the adjustment quantity of the service messages of the different type to be received in the current period to a front-end network element, so that the front-end network element performs traffic control on the service messages of the different type according to the quantity or the adjustment quantity of the service messages of the different type to be received in the current period.

With reference to the first aspect, in a first implementation manner of the first aspect, the sending the quantity or the adjustment quantity of the service messages of the different type to be received in the current period to a front-end network element includes adding, into a service response message, the quantity or the adjustment quantity of the service messages of the different type to be received in the current period, and sending the service response message to the front-end network element; or setting an overload control message, adding, into the overload control message, the quantity or the adjustment quantity of the service messages of the different type to be received in the current period, and sending the overload control message to the front-end network element.

With reference to the first aspect or the first implementation manner of the first aspect, in a second implementation manner of the first aspect, that the front-end network element performs traffic control on the service messages of the different type according to the quantity of the service messages of the different type to be received in the current period includes, for a service message of each type, directly rejecting or discarding, by the front-end network element, a service message that is beyond a quantity of service messages of the type to be received in the current period; or distributing, by the front-end network element to a load-sharing network element of the back-end network element, a service message that is beyond a quantity of service messages of the type to be received in the current period, so that the load-sharing network element performs processing.

With reference to the first aspect, or the first implementation manner of the first aspect, or the second implementation manner of the first aspect, in a third implementation manner of the first aspect, the method further includes receiving a service message sent by the front-end network element, and placing the service message into a different service message buffer queue according to a type of the service message.

With reference to the third implementation manner of the first aspect, in a fourth implementation manner of the first aspect, the obtaining, according to the priority of the service message and usage of the resource, a quantity or an adjustment quantity of service messages of a different type to be received in a current period includes setting a weight for each service message buffer queue according to a priority of a service message in each service message buffer queue; for each service message buffer queue, when usage of a resource for the service message in the service message buffer queue is less than a preset threshold, scheduling the service message from the service message buffer queue according to the weight of the service message buffer queue; and obtaining, according to a preset target delay and an average delay in scheduling the service message from the service message buffer queue in a previous period, a quantity or an adjustment quantity of service messages of a corresponding type to be received by the service message buffer queue in the current period, where the average delay is obtained by calculation according to the usage of the resource.

With reference to the fourth implementation manner of the first aspect, in a fifth implementation manner of the first aspect, the method further includes obtaining a total quantity of service messages that can be scheduled from the service message buffer queue in the current period and a quantity of service messages that have been scheduled from the service message buffer queue in the current period; and the scheduling the service message from the service message buffer queue according to the weight of the service message buffer queue includes scheduling the service message from the service message buffer queue according to the total quantity of the service messages that can be scheduled, the quantity of the service messages that have been scheduled, and the weight of the service message buffer queue.

According to a second aspect, a traffic control apparatus is provided, where the apparatus includes a determining unit, an obtaining unit, and a sending unit; the determining unit is configured to determine, according to a type of a received service message, a priority of the service message and a resource that needs to be consumed for processing the service message; the obtaining unit is configured to obtain, according to the priority of the service message determined by the determining unit and usage of the resource, a quantity or an adjustment quantity of service messages of a different type to be received in a current period; and the sending unit is configured to send, to a front-end network element, the quantity or the adjustment quantity, obtained by the obtaining unit, of the service messages of the different type to be received in the current period, so that the front-end network element performs traffic control on the service messages of the different type according to the quantity or the adjustment quantity of the service messages of the different type to be received in the current period.

With reference to the second aspect, in a first implementation manner of the second aspect, the sending unit is configured to add, into a service response message, the quantity or the adjustment quantity of the service messages of the different type to be received in the current period, and send the service response message to the front-end network element; or set an overload control message, add, into the overload control message, the quantity or the adjustment quantity of the service messages of the different type to be received in the current period, and send the overload control message to the front-end network element.

With reference to the second aspect or the first implementation manner of the second aspect, in a second implementation manner of the second aspect, the apparatus further includes a receiving unit configured to receive a service message sent by the front-end network element, and place the service message into a different service message buffer queue according to a type of the service message.

With reference to the second implementation manner of the second aspect, in a third implementation manner of the second aspect, the obtaining unit is configured to set a weight for each service message buffer queue according to a priority of a service message in each service message buffer queue; for each service message buffer queue, when usage of a resource for the service message in the service message buffer queue is less than a preset threshold, schedule the service message from the service message buffer queue according to the weight of the service message buffer queue; and obtain, according to a preset target delay and an average delay in scheduling the service message from the service message buffer queue in a previous period, a quantity or an adjustment quantity of service messages of a corresponding type to be received by the service message buffer queue in the current period, where the average delay is obtained by calculation according to the usage of the resource.

With reference to the third implementation manner of the second aspect, in a fourth implementation manner of the second aspect, the obtaining unit is further configured to obtain a total quantity of service messages that can be scheduled from the service message buffer queue in the current period and a quantity of service messages that have been scheduled from the service message buffer queue in the current period; and schedule the service message from the service message buffer queue according to the total quantity of the service messages that can be scheduled, the quantity of the service messages that have been scheduled, and the weight of the service message buffer queue.

According to the traffic control method and apparatus provided in the embodiments of the present disclosure, for a service message of a different type, an obtained quantity or adjustment quantity of service messages of the different type to be received in a current period is different, so that a front-end network element may perform differential traffic control on the service messages of the different type according to the quantity or the adjustment quantity of the service messages of the different type to be received in the current period. In this way, a problem that the front-end network element performs traffic control on a non-overloaded service message can be avoided.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

To facilitate understanding of the embodiments of the present disclosure, the following gives further explanation and description using a specific embodiment with reference to the accompanying drawings, and the embodiment does not constitute a limitation on the embodiments of the present disclosure.

According to a traffic control method and apparatus provided in the embodiments of the present disclosure, for a service message of a different type, an obtained quantity or adjustment quantity of service messages of the different type to be received in a current period is different, so that a front-end network element may perform differential traffic control on the service messages of the different type according to the quantity or the adjustment quantity of the service messages of the different type to be received in the current period. In this way, a problem that the front-end network element performs traffic control on a non-overloaded service message can be avoided.

Figure 1A:
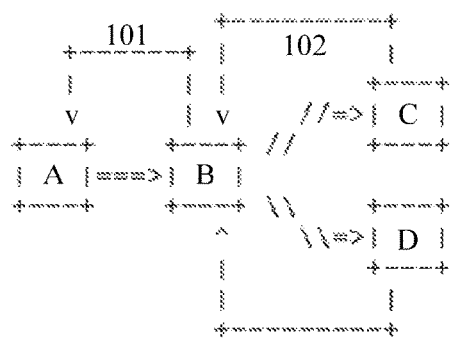
FIG. 1A shows a prior art traffic control model for hop-by-hop.
Figure 1B:
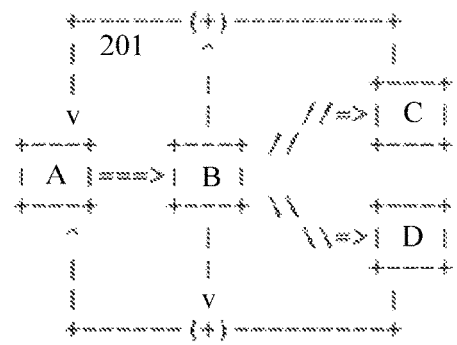
FIG. 1B shows a prior art traffic control model for end-to-end.
Figure 1C:
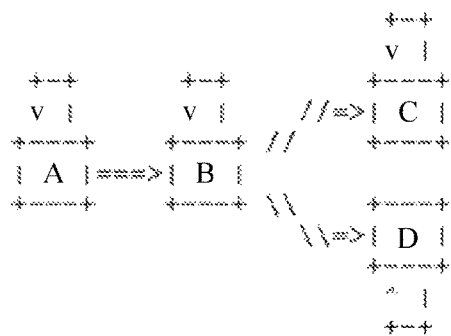
FIG. 1C shows a prior art traffic control model for local overload control.
Figure 2:
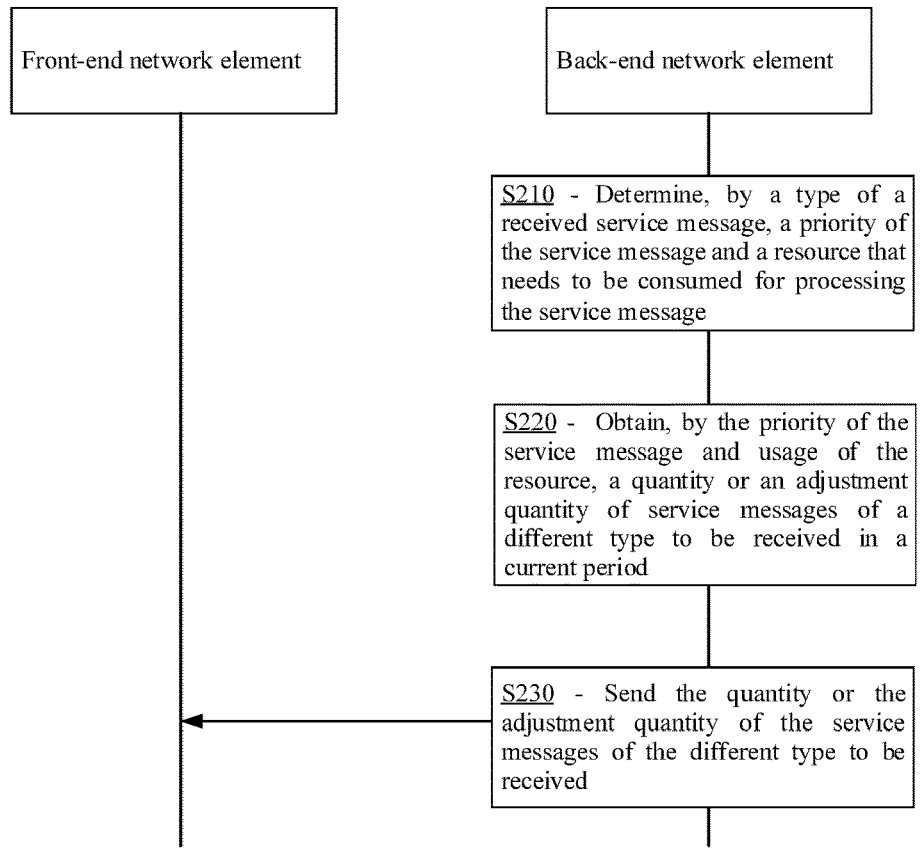
FIG. 2 is a dataflow diagram of a traffic control method according to Embodiment 1 of the present disclosure.

FIG. 2 is a flowchart of a traffic control method according to Embodiment 1 of the present disclosure. The method is executed by a back-end network element. As shown in FIG. 2, the method includes the following steps.

S210. The back-end network element determines, according to a type of a received service message, a priority of the service message and a resource that needs to be consumed for processing the service message.

A network element is a network unit or a node in a network system, or the network element may be a device that can independently complete one or several functions. The network element includes a front-end network element and a back-end network element (that is, a back-end overloaded network element). The front-end network element is used to control, according to a load status of the back-end network element, a rate of sending a service message to the back-end network element, and the back-end network element is used to instruct the front-end network element to control the rate of sending the service message.

For example, in an internet protocol (IP) multimedia subsystem (IMS) network, a session border controller (SBC) is a front-end network element, and a call session control function (CSCF) is a back-end network element. Service messages sent by the SBC to the CSCF are classified into eight types: invitation (INVITE), registration (REGISTER), capability query (OPTIONS), message (MESSAGE), information (INFO), subscription (SUBSCRIBE), notification (NOTIFY), and publishing (PUBLISH). When receiving a service message of any one of the foregoing types, the front-end network element SBC parses the service message (for example, using a keyword parsing method), so as to obtain a type corresponding to the service message. After the type of the service message is obtained, a priority corresponding to the service message may be further determined. Priorities of service messages of a same type may be the same, or may be different.

In this embodiment, it is assumed that the priorities of the service messages of the same type are the same, that is, it is assumed that priorities of service messages of the eight types in the foregoing example, namely, INVITE, REGISTER, OPTIONS, MESSAGE, INFO, SUBSCRIBE, NOTIFY, and PUBLISH are 10, 8, 6, 5, 4, 3, 2, and 1 respectively.

It should be noted that, for the foregoing service message, after the type of the service message is obtained, the resource that needs to be consumed for processing the service message is also determined. One or more resources need to be consumed for processing a service message of a different type. For example, one resource, which may be a notification service control table, needs to be consumed for processing a service message of the NOTIFY type. The notification service control table is used to store status/control data of a notification service processing process.

Preferably, after receiving a service message sent by the front-end network element, the back-end network element places the service message into a different service message buffer queue according to a type of the service message.

As described in the foregoing example, the back-end network element CSCF pre-establishes eight service message buffer queues for service messages of the foregoing eight types, and each service message buffer queue is used to buffer received service messages of a same type, that is, each service message buffer queue corresponds to a specific type. Then, according to the type of the received service message, the service message is placed into a service message buffer queue that is of the same type as the service message. The back-end network element pre-establishes eight service message buffer queues respectively for INVITE, REGISTER, OPTIONS, MESSAGE, INFO, SUBSCRIBE, NOTIFY, and PUBLISH service messages: queue 1, queue 2, queue 3, queue 4, queue 5, queue 6, queue 7, and queue 8. When a service message of the NOTIFY type is received, the service message is placed into the queue 7.

S220. Obtain, according to the priority of the service message and usage of the resource, a quantity or an adjustment quantity of service messages of a different type to be received in a current period.

Further, S220 may further include the following steps.

S2201. Set a weight for each service message buffer queue according to a priority of a service message in each service message buffer queue.

As described in the foregoing example, weights are set for the foregoing eight service message buffer queues according to the priorities of the service messages buffered in the service message buffer queues, and the weights are 10, 8, 6, 5, 4, 3, 2, and 1 respectively. For the eight service message buffer queues with the weights set, when scheduling service messages from the eight service message buffer queues for processing, the back-end network element successively schedules the service messages from the queue 1, the queue 2, the queue 3, the queue 4, the queue 5, the queue 6, the queue 7, and the queue 8 for processing. In a process of scheduling a service message from any service message buffer queue, a service message first joining a service message buffer queue is first scheduled, and then, a weight of the foregoing service message buffer queue is subtracted by 1. After service message scheduling from the queue 8 is completed, the process returns to the queue 1. In this way, the service messages are circularly scheduled from the eight service message buffer queues in succession. In the foregoing process, after scheduling from any service message buffer queue is completed, a weight of the service message buffer queue is restored to the initially set weight.

S2202. For each service message buffer queue, when usage of a resource for the service message in the service message buffer queue is less than a preset threshold, schedule the service message from the service message buffer queue according to the weight of the service message buffer queue.

Preferably, after the weight is set for each service message buffer queue, a total quantity of service messages that can be scheduled from the service message buffer queue in the current period and a quantity of service messages that have been scheduled from the service message buffer queue in the current period further need to be obtained for each service message buffer queue. Afterwards, the service message is scheduled from the service message buffer queue according to the total quantity of the service messages that can be scheduled, the quantity of the service messages that have been scheduled, and the weight of the service message buffer queue.

The obtaining a total quantity of service messages that can be scheduled from the service message buffer queue in the current period may further include periodically detecting the usage of the resource that needs to be consumed for processing the service message in the service message buffer queue, and when the usage of the resource for the service message in the service message buffer queue is less than the preset threshold, obtaining the total quantity of the service messages that can be scheduling from the service message buffer queue in the current period, according to a preset target usage of the resource, usage of the resource in a previous period, and a total quantity of service messages that can be scheduled from the service message buffer queue in the previous period.

As described in the foregoing example, the back-end network element periodically (for example, every 1 s) detects usage of resources for the queue 1 to the queue 8. For the queue 7, it is assumed that a resource that needs to be consumed for processing a service message in the queue 7 includes only a notification service control table, and a preset target usage of the notification service control table is 80%. In this case, if usage of the notification service control table is 50% (assuming that the preset threshold is 90%, the usage of the resource is less than the preset threshold in this case) in the current period (which is assumed to be at the $10^{th}$ s), and a total quantity of service messages that can be scheduled from the queue 7 is 30 in the current period, a total quantity of service messages that can be scheduled from the queue 7 is (80%/50%)*30 =48 in the next period, that is, at the $11^{th}$ s. That is, 48 service messages can be scheduled from the queue 7 at the $11^{th}$ s.

It should be noted that, the total quantity of the service messages that can be scheduled from the service message buffer queue in the current period is greatly different from the total quantity of the service messages that can be scheduled in the previous period (that is, 30–>48), where the total quantities are obtained by calculation according to the foregoing method. Therefore, a maximum difference may be limited to, for example, 5. If a difference between the total quantity of the service messages that can be scheduled in the current period and the total quantity of the service messages that can be scheduled in the previous period exceeds 5, adjustment of the foregoing difference is subject to 5, that is, (48–30) is adjusted to 5. Therefore, in the foregoing example, it may be determined that the total quantity of the service messages that can be scheduled from the queue 7 in the current period is 30+5=35.

Optionally, the periodically detecting the usage of the resource that needs to be consumed for processing the service message in the service message buffer queue may be replaced by detecting, before the service message is scheduled from the service message buffer queue each time, whether the usage that needs to be consumed for processing the service message in the service message buffer queue reaches the preset threshold; and if the usage reaches the preset threshold, skipping scheduling the service message from the service message buffer queue, and jumping to a next queue in sequence to schedule a service message from the next queue; or if the usage does not reach the preset threshold, directly scheduling a service message from the service message buffer queue.

As described in the foregoing example, in a process of scheduling a service message from the queue 7, assuming that usage of a resource for the queue 7 already reaches 80%, and assuming that the preset threshold is 80%, the usage of the resource for the queue 7 already reaches the preset threshold. Therefore, the back-end network element does not schedule a service message from the queue 7 this time, but jumps to the queue 8 and schedules a service message from the queue 8. When detection is performed on usage of a resource that needs to be consumed for processing a service message in another service message buffer queue, the preset threshold may be 80%, or may be another value.

In the foregoing example, if the usage of the resource for the queue 7 does not reach the preset threshold, a service message is scheduled from the queue 7. In addition, scheduled status/control data of the notification service processing process is stored into the notification service control table. It may be understood that an amount of status/control data of the notification service processing process in the notification service control table increases accordingly, that is, the usage of the resource for the queue 7 increases accordingly.

The scheduling the service message from the service message buffer queue according to the total quantity of the service messages that can be scheduled, the quantity of the service messages that have been scheduled, and the weight of the service message buffer queue may further include obtaining a difference between the total quantity of the service messages that can be scheduled and the quantity of the service messages that have been scheduled; and if the weight of the service message buffer queue is less than the difference, scheduling the service message from the service message buffer queue according to the weight of the service message buffer queue; or if the weight of the service message buffer queue is greater than or equal to the difference, scheduling the service message from the service message buffer queue according to the difference.

As described in the foregoing example, it is assumed that an initially set weight of the queue 7 is 2 and 30 service messages are buffered in the queue 7, and it is assumed that the total quantity of the service messages that can be scheduled from the queue 7 in the current period is 10, where the total quality is obtained by calculation according to the method provided in the foregoing example. In this case, when a service message is scheduled from the queue 7 in the first round robin to the queue 7 in a current period, because the quantity of the service messages that have been scheduled is 0, the difference between the total quantity and the quantity of the service messages that have been scheduled is 10−0=10. In addition, the weight (2) of the queue 7 is less than the difference (10). Therefore, the service message is scheduled from the queue 7 according to the weight of the queue 7, that is, the back-end network element may schedule two service messages from the queue 7 this time. The weight of the queue 7 is subtracted by 1 each time one service message is scheduled from the queue 7, and when the weight of the queue 7 is 0, scheduling of a service message from the queue 7 is completed and the process jumps to the queue 8, and the weight of the queue 7 is restored to the initially set weight 2.

It should be noted that, in the foregoing example, if the quantity of the service messages that have been scheduled is 2 when a service message is to be scheduled from the queue 7 in the second round robin to the queue 7 in the current period, the difference between the total quantity and the quantity of the service messages that have been scheduled is 10−2=8. Then, the difference (8) is compared with the weight 2, and the service message is scheduled from the queue 7, and by analogy.

It should be noted that, in the present disclosure, the back-end network element does not actively control, according to CPU usage, a rate of scheduling a service message from a service message buffer queue. When the CPU usage increases, the rate at which the back-end network element schedules a service message from the service message buffer queue automatically decreases due to impact of task scheduling of an operating system. Because the back-end network element does not actively control the rate based on the CPU usage, impact of inaccurate observation and great fluctuation of the CPU usage on a traffic control effect can be avoided. When a quantity of available CPU resources changes due to a software or hardware change, a traffic control threshold parameter does not need to be accordingly adjusted.

S2203. Obtain, according to a preset target delay and an average delay in scheduling the service message from the service message buffer queue in a previous period, a quantity or an adjustment quantity of service messages of a corresponding type to be received by the service message buffer queue in the current period, where the average delay is obtained by calculation according to the usage of the resource.

The average delay in scheduling the service message from the service message buffer queue in the previous period is equal to a sum of delays in scheduling n service messages divided by the total quantity n of the service messages that can be scheduled from the service message buffer queue in the previous period. A delay in scheduling one service message is equal to service message queue-leaving time subtracted by service message queue joining time. It may be understood that, the total quantity of the service messages that can be scheduled from the service message buffer queue in the previous period is obtained by calculation according to the usage of the resource. The average delay in scheduling the service message is obtained by calculation according to the total quantity of the service messages. Therefore, the average delay is obtained according to the usage of the resource.

It should be noted that, a service message that is not scheduled from the service message buffer queue is buffered in the service message buffer queue. If a quantity of service messages received in the service message buffer queue is always greater than the total quantity of scheduled service messages, a quantity of messages buffered in the service message buffer queue increases, and a delay in scheduling a service message increases.

To prevent an excessive delay for a service message, the quantity of the service messages to be received by the service message buffer queue in the current period needs to be controlled according to the preset target delay.

Optionally, the preset target delay includes an upper threshold and a lower threshold.

The obtaining, according to a preset target delay and an average delay in scheduling the service message from the service message buffer queue in a previous period, a quantity or an adjustment quantity of service messages of a corresponding type to be received by the service message buffer queue in the current period includes obtaining the quantity or the adjustment quantity of the service messages of the type to be received in the service message buffer queue in the current period according to the upper threshold, the lower threshold, the average delay in scheduling the service message from the service message buffer queue in the previous period, and the quantity of the service messages of the corresponding type received by the service message buffer queue in the previous period. It should be noted that, the upper threshold is set according to timeout duration of a service message. For the queue 7, a service message times out if a delay in scheduling the service message from the queue 7 is greater than 3 seconds(s). In this case, C_MAX may be set to 500 milliseconds (ms). Setting a value of C_MAX to be less than a timeout delay is to ensure that the delay of the service message in the queue 7 is not excessively large after a resource is overloaded. Resource overload means that usage of a resource that needs to be consumed for processing a service message in a service message buffer queue is greater than a preset threshold. The lower threshold is set according to the average delay in scheduling the service message from the service message buffer queue if the resource is not overloaded, and may be set to 300 ms.

For example, for the queue 7, it is assumed that the average delay in scheduling the service message from the queue 7 in the previous period is B, the quantity of the service messages of the corresponding type received by the queue 7 in the previous period is A, an upper threshold of the service message in the queue 7 is C_MAX, a lower threshold of the service message in the queue 7 is C_MIN, and the quantity of the service messages of the corresponding type to be received by the queue 7 in the current period is represented as D.

A method for calculating D according to C_MIN, C_MAX, A, and B is as follows.

If B<C_MIN, it indicates that the average delay in scheduling the service message from the queue 7 is relatively small, that is, a quantity of service messages buffered in the queue 7 is relatively small, and the quantity of the service messages of the corresponding type to be received by the queue 7 is increased according to an adjustment amount (for example, 10%), that is, D=A×(1+10%).

If B≥C_MIN and B<(C_MIN+C_MAX)/2, in a process of scheduling a service message from the queue 7, the usage of the resource for the queue 7 increases accordingly, and the total quantity of the service messages that can be scheduled from the queue 7 decreases accordingly. Therefore, the average delay in scheduling the service message from the queue 7 increases, and the foregoing adjustment amount may be appropriately decreased. For example, the quantity of the service messages of the corresponding type to be received by the queue 7 is increased by an adjustment amount 3%, that is, D=A×(1+3%).

If B≥(C_MIN+C_MAX)/2 and B<C_MAX, the resource for the queue 7 is overloaded when the usage of the resource for the queue 7 continuously increases, that is, when the usage of the resource for the queue 7 is greater than the preset threshold. The quantity of the service messages of the corresponding type to be received by the queue 7 may be decreased by an adjustment amount (for example, 3%), that is D=A×(1-3%).

If B≥C_MAX, it indicates that a quantity of service messages buffered in the queue 7 is relatively large. To prevent a service message in the queue 7 from being timed out, the foregoing adjustment amount may be appropriately increased. For example, the quantity of the service messages of the corresponding type to be received by the queue 7 is decreased by an adjustment amount 10%, that is, D=A×(1-10%).

The increased or decreased adjustment amount in the foregoing method may be optimized according to an actual test effect.

Likewise, quantities of service messages of corresponding types to be received by the queues 2 to 8 may be obtained according to the foregoing method.

S230. Send the quantity or the adjustment quantity of the service messages of the different type to be received in the current period to a front-end network element, so that the front-end network element performs traffic control on the service messages of the different type according to the quantity or the adjustment quantity of the service messages of the different type to be received in the current period.

As described in the foregoing example, for a service message of any type, the back-end network element may send, to the front-end network element, D obtained by calculation in the foregoing four scenarios, or may directly send the increased or decreased adjustment amount in the four scenarios to the front-end network element, so that the front-end network element obtains D according to the received increased or decreased adjustment amount. After obtaining D, for example, D is 10/s, the front-end network element sends a service message of the foregoing type to the back-end network element at a rate of sending 10 service messages per second. The front-end network element may directly reject or discard a service message that is beyond the quantity of the service messages of the corresponding type to be received by the service message buffer queue in the current period. Alternatively, if the back-end network element has a load-sharing network element, the front-end network element may distribute, to the load-sharing network element of the back-end network element, the service message that is beyond the quantity of the service messages of the corresponding type to be received by the service message buffer queue in the current period, so that the load-sharing network element properly processes the service message, which increases network resource utilization and a service message success rate.

Further, the sending the quantity or the adjustment quantity of the service messages of the different type to be received in the current period to a front-end network element includes adding, into a service response message, the quantity or the adjustment quantity of the service messages of the different type to be received in the current period, and sending the service response message to the front-end network element; or setting an overload control message, adding, into the overload control message, the quantity or the adjustment quantity of the service messages of the different type to be received in the current period, and sending the overload control message to the front-end network element.

According to the traffic control method provided in this embodiment of the present disclosure, for a service message of a different type, an obtained quantity or adjustment quantity of service messages of the different type to be received in a current period is different, so that a front-end network element may perform differential traffic control on the service messages of the different type according to the quantity or the adjustment quantity of the service messages of the different type to be received in the current period. In this way, a problem that the front-end network element performs traffic control on a non-overloaded service message can be avoided.

Figure 3:
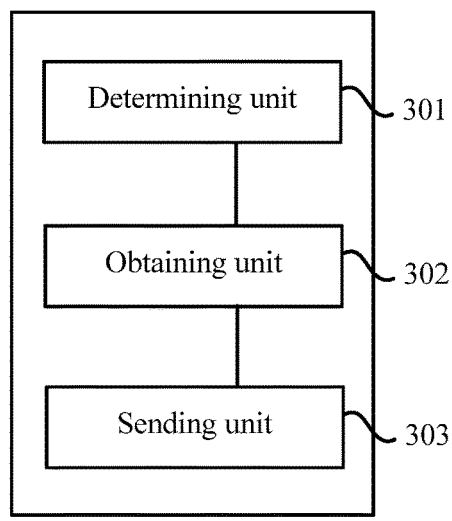
FIG. 3 is a schematic diagram of a traffic control apparatus according to Embodiment 2 of the present disclosure.

FIG. 3 is a schematic diagram of a traffic control apparatus according to Embodiment 2 of the present disclosure. The apparatus may be used to execute the method described in FIG. 2. In FIG. 3, the apparatus includes a determining unit 301, an obtaining unit 302, and a sending unit 303.

The determining unit 301 is configured to determine, according to a type of a received service message, a priority of the service message and a resource that needs to be consumed for processing the service message.

The obtaining unit 302 is configured to obtain, according to the priority of the service message determined by the determining unit 301 and usage of the resource, a quantity or an adjustment quantity of service messages of a different type to be received in a current period.

The sending unit 303 is configured to send, to a front-end network element, the quantity or the adjustment quantity, obtained by the obtaining unit 302, of the service messages of the different type to be received in the current period, so that the front-end network element performs traffic control on the service messages of the different type according to the quantity or the adjustment quantity of the service messages of the different type to be received in the current period.

Optionally, the sending unit 303 is configured to add, into a service response message, the quantity or the adjustment quantity of the service messages of the different type to be received in the current period, and send the service response message to the front-end network element; or set an overload control message, add, into the overload control message, the quantity or the adjustment quantity of the service messages of the different type to be received in the current period, and send the overload control message to the front-end network element.

Optionally, the apparatus further includes a receiving unit 304 configured to receive a service message sent by the front-end network element, and place the service message into a different service message buffer queue according to a type of the service message.

Optionally, the obtaining unit 302 is configured to set a weight for each service message buffer queue according to a priority of a service message in each service message buffer queue; for each service message buffer queue, when usage of a resource for the service message in the service message buffer queue is less than a preset threshold, schedule the service message from the service message buffer queue according to the weight of the service message buffer queue; and obtain, according to a preset target delay and an average delay in scheduling the service message from the service message buffer queue in a previous period, a quantity or an adjustment quantity of service messages of a corresponding type to be received by the service message buffer queue in the current period, where the average delay is obtained by calculation according to the usage of the resource.

Optionally, the obtaining unit 302 is further configured to obtain a total quantity of service messages that can be scheduled from the service message buffer queue in the current period and a quantity of service messages that have been scheduled from the service message buffer queue in the current period; and schedule the service message from the service message buffer queue according to the total quantity of the service messages that can be scheduled, the quantity of the service messages that have been scheduled, and the weight of the service message buffer queue.

The method provided in Embodiment 1 of the present disclosure is embedded in the apparatus provided in Embodiment 2 of the present disclosure. Therefore, for a specific working process of the apparatus provided in the present disclosure, details are not described herein.

According to the traffic control apparatus provided in this embodiment of the present disclosure, for a service message of a different type, an obtained quantity or adjustment quantity of service messages of the different type to be received in a current period is different, so that a front-end network element may perform differential traffic control on the service messages of the different type according to the quantity or the adjustment quantity of the service messages of the different type to be received in the current period. In this way, a problem that the front-end network element performs traffic control on a non-overloaded service message can be avoided.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof The software module may reside in a random access memory (RAM), a memory, a read-only memory (ROM), an electrically programmable ROM, an electrically erasable programmable ROM, a register, a hard disk, a removable disk, a compact disc (CD)-ROM, or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A traffic control method performed by a back-end network element, comprising:

receiving a service message from a front-end network element;

placing the received service message into a service message buffer queue according to a type of the received service message;

determining, according to the type of the received service message, a priority of the received service message and a resource that needs to be consumed for processing the received service message;

setting a weight for each service message buffer queue according to a priority of a service message in each service message buffer queue;

scheduling, for the each service message buffer queue, the service message in the each service message buffer queue according to the weight of the each service message buffer queue when usage of a resource for the service message in the each service message buffer queue is less than a preset threshold;

obtaining, according to a preset target delay and an average delay in scheduling the service message in the each service message buffer queue in a previous period, a quantity or an adjustment quantity of service messages of a corresponding type to be received by the each service message buffer queue in the current period, the average delay being obtained by calculation according to the usage of the resource; and sending the quantity or the adjustment quantity of the service messages of the different type to be received in the current period to a front-end network element to permit the front-end network element to perform traffic control on the service messages of the different type according to the quantity or the adjustment quantity of the service messages of the different type to be received in the current period.

2. The method of claim 1, wherein sending the quantity or the adjustment quantity of the service messages of the different type to be received in the current period to the front-end network element comprises:

adding, into a service response message, the quantity or the adjustment quantity of the service messages of the different type to be received in the current period; and sending the service response message to the front-end network element.

3. The method of claim 1, wherein sending the quantity or the adjustment quantity of the service messages of the different type to be received in the current period to the front-end network element comprises:

setting an overload control message;

adding, into the overload control message, the quantity or the adjustment quantity of the service messages of the different type to be received in the current period; and sending the overload control message to the front-end network element.

4. The method of claim 1, wherein permitting the front-end network element to perform traffic control on the service messages of the different types according to the quantity of the service messages of the different type to be received in the current period comprises:

permitting the front-end network element to directly reject or discard, for a service message of each type, a service message beyond a quantity of service messages of the type to be received in the current period; or permitting the front-end network element to distribute to a load-sharing network element of the back-end network element, a service message beyond a quantity of service messages of the type to be received in the current period such that the load-sharing network element performs processing.

5. The method of claim 1, further comprising obtaining a total quantity of service messages that can be scheduled from the service message buffer queue in the current period and a quantity of service messages that have been scheduled from the service message buffer queue in the current period, scheduling the service message from the service message buffer queue according to the weight of the service message buffer queue comprising scheduling the service message from the service message buffer queue according to the total quantity of the service messages that can be scheduled, the quantity of the service messages that have been scheduled, and the weight of the service message buffer queue.

6. A traffic control apparatus, comprising:
a memory storage comprising instructions; and
one or more processors coupled to the memory storage, the one or more processors executing the instructions to:
receive a service message from a front-end network element;
placing the received service message into a service message buffer queue according to a type of the received service message;
determine, according to the type of the received service message, a priority of the received service message and a resource that needs to be consumed for processing the received service message;
set a weight for each service message buffer queue according to a priority of a service message in each service message buffer queue;
schedule, for each service message buffer queue, the service message in the each service message buffer queue according to the weight of the each service message buffer queue when usage of a resource for the service message in the each service message buffer queue is less than a preset threshold;
obtain, according to a preset target delay and an average delay in scheduling the service message in the each service message buffer queue in a previous period, a quantity or an adjustment quantity of service messages of a corresponding type to be received by the each service message buffer queue in the current period, the average delay being obtained by calculation according to the usage of the resource; and
send the quantity or the adjustment quantity of the service messages of the different type to be received in the current period to a front-end network element so as to permit the front-end network element to perform traffic control on the service messages of the different type according to the quantity or the adjustment quantity of the service messages of the different type to be received in the current period.

7. The traffic control apparatus of claim 6, wherein the one or more processors further execute the instructions to:
add, into a service response message, the quantity or the adjustment quantity of the service messages of the different type to be received in the current period; and
send the service response message to the front-end network element.

8. The traffic control apparatus of claim 6, wherein the one or more processors further execute the instructions to:
set an overload control message;
add, into the overload control message, the quantity or the adjustment quantity of the service messages of the different type to be received in the current period; and
send the overload control message to the front-end network element.

* * * * *